(12) United States Patent
You et al.

(10) Patent No.: US 10,509,248 B2
(45) Date of Patent: Dec. 17, 2019

(54) BACK COVER INTEGRATED WITH LIGHT GUIDE PLATE AND METHOD OF MANUFACTURING THE SAME, AND BACK LIGHT UNIT AND LIQUID CRYSTAL DISPLAY DEVICE INCLUDING THE SAME

(71) Applicant: LG Display Co., Ltd., Seoul (KR)

(72) Inventors: YoungYoon You, Gwangju (KR); MinJin Lee, Goyang-si (KR); Kyoung Sang Yoon, Paju-si (KR); Euncheol Park, Bucheon-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/662,466

(22) Filed: Jul. 28, 2017

(65) Prior Publication Data

US 2018/0031900 A1 Feb. 1, 2018

(30) Foreign Application Priority Data

Jul. 29, 2016 (KR) ........................ 10-2016-0097557

(51) Int. Cl.
*G02F 1/1333* (2006.01)
*F21V 8/00* (2006.01)
*G02F 1/1335* (2006.01)

(52) U.S. Cl.
CPC ....... *G02F 1/133308* (2013.01); *G02B 6/005* (2013.01); *G02B 6/009* (2013.01); *G02B 6/0071* (2013.01); *G02B 6/0085* (2013.01); *G02F 1/1335* (2013.01); *G02F 1/133615* (2013.01); *G02F 2001/133314* (2013.01); *G02F 2001/133317* (2013.01)

(58) Field of Classification Search
CPC ... G02F 2001/133331; G02F 1/133605; G02F 1/13308; G02F 1/1335; G02F 2001/133314; G02F 2001/133317; G02F 1/133615; G02B 6/0071; G02B 6/009; G02B 6/005; G02B 6/0085
USPC ...................................... 349/58–60
See application file for complete search history.

(56) References Cited

U.S. PATENT DOCUMENTS

2013/0082989 A1 4/2013 Song et al.
2016/0154169 A1 6/2016 Zhou
2017/0254947 A1* 9/2017 Fan ...................... G02B 6/0043

FOREIGN PATENT DOCUMENTS

CN 103035171 A 4/2013
CN 104501094 A 4/2015
(Continued)

OTHER PUBLICATIONS

Office Action dated Apr. 3, 2019 with English translation issued in the corresponding Chinese Patent Application No. 201710630570.2, pp. 1-24.

(Continued)

*Primary Examiner* — Charles S Chang
(74) *Attorney, Agent, or Firm* — Polsinelli PC

(57) ABSTRACT

A back cover integrated with a light guide plate and a method of manufacturing the same, and a back light unit and a liquid crystal display device including the same are disclosed. The back cover integrated with a light guide plate comprises a reflective sheet attached onto a cover glass; a light guide plate attached onto the cover glass to cover the reflective sheet; and a light guide plate coupling member between the light guide plate and the cover glass.

18 Claims, 6 Drawing Sheets

(56) References Cited

FOREIGN PATENT DOCUMENTS

| | | | | |
|---|---|---|---|---|
| CN | 104718520 | A | 6/2015 | |
| CN | 104865745 | A | 8/2015 | |
| CN | 104964211 | A | 10/2015 | |
| CN | 105182463 | A * | 12/2015 | ........... G02B 6/0043 |

OTHER PUBLICATIONS

Chinese Office Action issued in corresponding Chinese Patent Application No. 201710630570.2 dated Oct. 8, 2019.

* cited by examiner

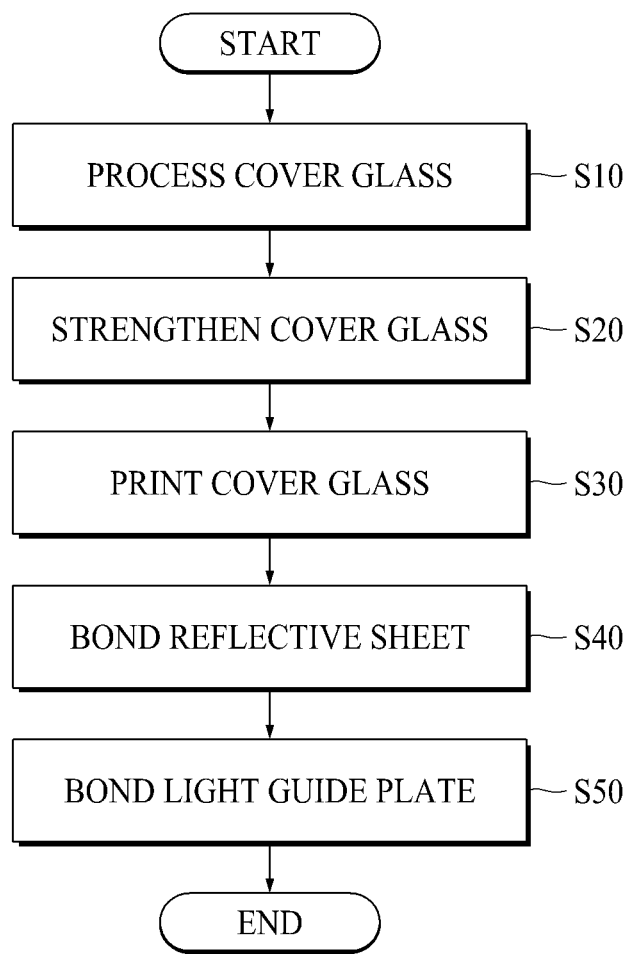

BACK COVER INTEGRATED WITH LIGHT GUIDE PLATE AND METHOD OF MANUFACTURING THE SAME, AND BACK LIGHT UNIT AND LIQUID CRYSTAL DISPLAY DEVICE INCLUDING THE SAME

CROSS REFERENCE TO RELATED APPLICATION

This application claims the benefit of the Korean Patent Application No. 10-2016-0097557 filed on Jul. 29, 2016, which is hereby incorporated by reference in its entirety for all purposes as if fully set forth herein.

BACKGROUND

Field of the Disclosure

The present disclosure relates to a display device, and more particularly, to a back cover integrated with a light guide plate and a method of manufacturing the same, and a back light unit and a liquid crystal display device including the same.

Description of the Background

Generally, a liquid crystal display device displays an image by controlling light transmittance of liquid crystal molecules having a dielectric anisotropy using an electric field. To this end, a liquid crystal display device of the related art includes a liquid crystal panel on which liquid crystal cells are arranged in a matrix arrangement, a panel driver for driving the liquid crystal panel, and a back light unit for irradiating light to the liquid crystal panel. Also, the back light unit of the related art includes a light guide plate, a light source module for irradiating light to the light guide plate, and a reflective sheet for reflecting incident light from the light guide plate to the liquid crystal panel.

The liquid crystal display device including the back light unit has been studied and developed in view of technical aspects such as response speed and picture quality.

However, the liquid crystal display device of the related art developed up to now has a limitation in improving technical aspects due to characteristics of its parts. For example, the reflective sheet of the back light unit according to the related art, which is thin, can be wrinkled due to humidity or heat, and the portion where the reflective sheet is wrinkled is seen as a black and white image, whereby a problem can occur in that picture quality is deteriorated.

SUMMARY

Accordingly, the present disclosure is directed to a back cover integrated with a light guide plate and a method of manufacturing the same, and a back light unit and a liquid crystal display device including the same, which substantially obviate one or more problems due to limitations and disadvantages of the related art.

An advantage of the present disclosure is to provide a back cover integrated with a light guide plate and a method of manufacturing the same, and a back light unit and a liquid crystal display device including the same, in which picture quality is prevented from being deteriorated.

Additional advantages and features of the disclosure will be set forth in part in the description which follows and in part will become apparent to those having ordinary skill in the art upon examination of the following or may be learned from practice of the disclosure. The other advantages of the disclosure may be realized and attained by the structure particularly pointed out in the written description and claims hereof as well as the appended drawings.

To achieve these and other advantages and in accordance with the purpose of the disclosure, as embodied and broadly described herein, a back cover integrated with a light guide plate according to one aspect of the present disclosure comprises a reflective sheet attached onto a cover glass; a light guide plate attached onto the cover glass to cover the reflective sheet; and a light guide plate coupling member between the light guide plate and the cover glass.

In another aspect of the present disclosure, a back cover of a display device includes a cover glass having an elasticity; a light guide plate integrated with the cover glass and having the same material as the cover glass; a reflective sheet between the cover glass and the light guide plate; and a light guide plate coupling member attaching the light guide plate to the cover glass, wherein the light guide plate integrated with the cover glass are disposed to press both upper and lower sides of the reflective sheet to prevent damages on the reflective sheet.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspect(s) of the disclosure and together with the description serve to explain the principle of the disclosure.

In the drawings:

FIG. 8 is a flow chart illustrating a method of manufacturing a back cover integrated with a light guide plate according to one aspect of the present disclosure.

DETAILED DESCRIPTION

Terms disclosed in this specification should be understood as follows.

The term of a singular expression should be understood to include a multiple expression as well as the singular expression if there is no specific definition in the context. The terms such as "the first" and "the second" are used only to differentiate one element from other elements. Thus, a scope of claims is not limited by these terms. Also, it should be understood that the term such as "include" or "have" does not preclude existence or possibility of one or more features, numbers, steps, operations, elements, parts or their combinations. It should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements.

Hereinafter, a back cover integrated with a light guide plate and a method of manufacturing the same, and a back light unit and a liquid crystal display device including the same according to the preferred aspects of the present disclosure will be described in detail with reference to the accompanying drawings. Wherever possible, the same reference numbers will be used throughout the drawings to refer to the same or like parts. Also, in the following description of the present disclosure, if detailed description of elements or functions known in respect of the present disclosure is determined to make the subject matter of the present disclosure unnecessarily obscure, the detailed description will be omitted.

Figure 1:
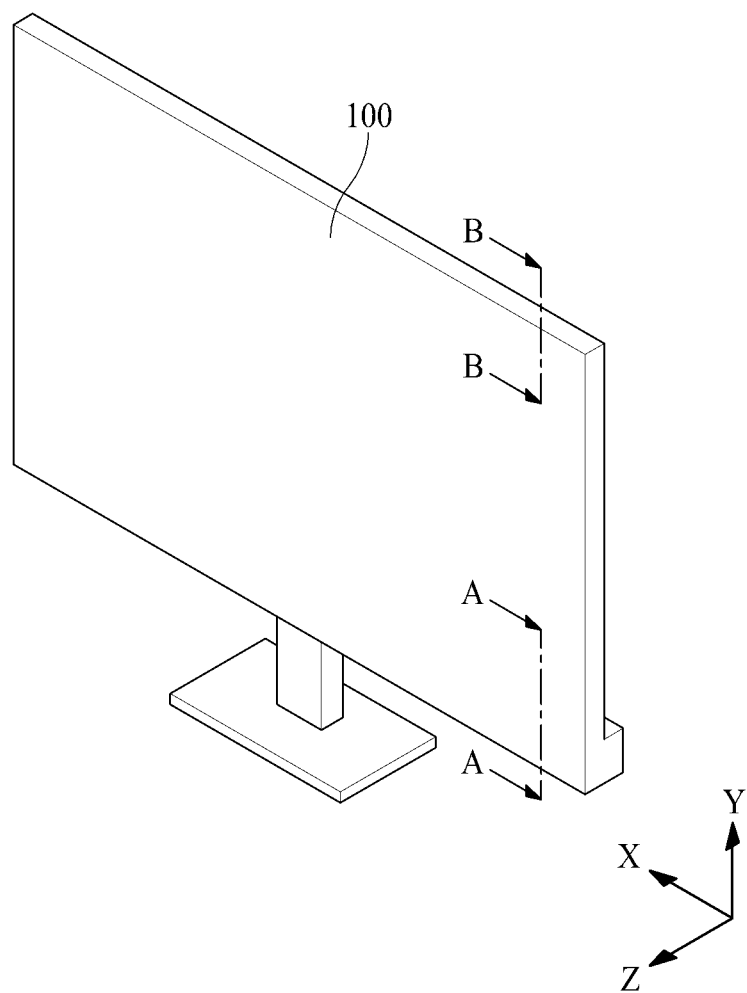
FIG. 1 is a perspective view illustrating a liquid crystal display device according to an aspect of the present disclosure.
Figure 2:
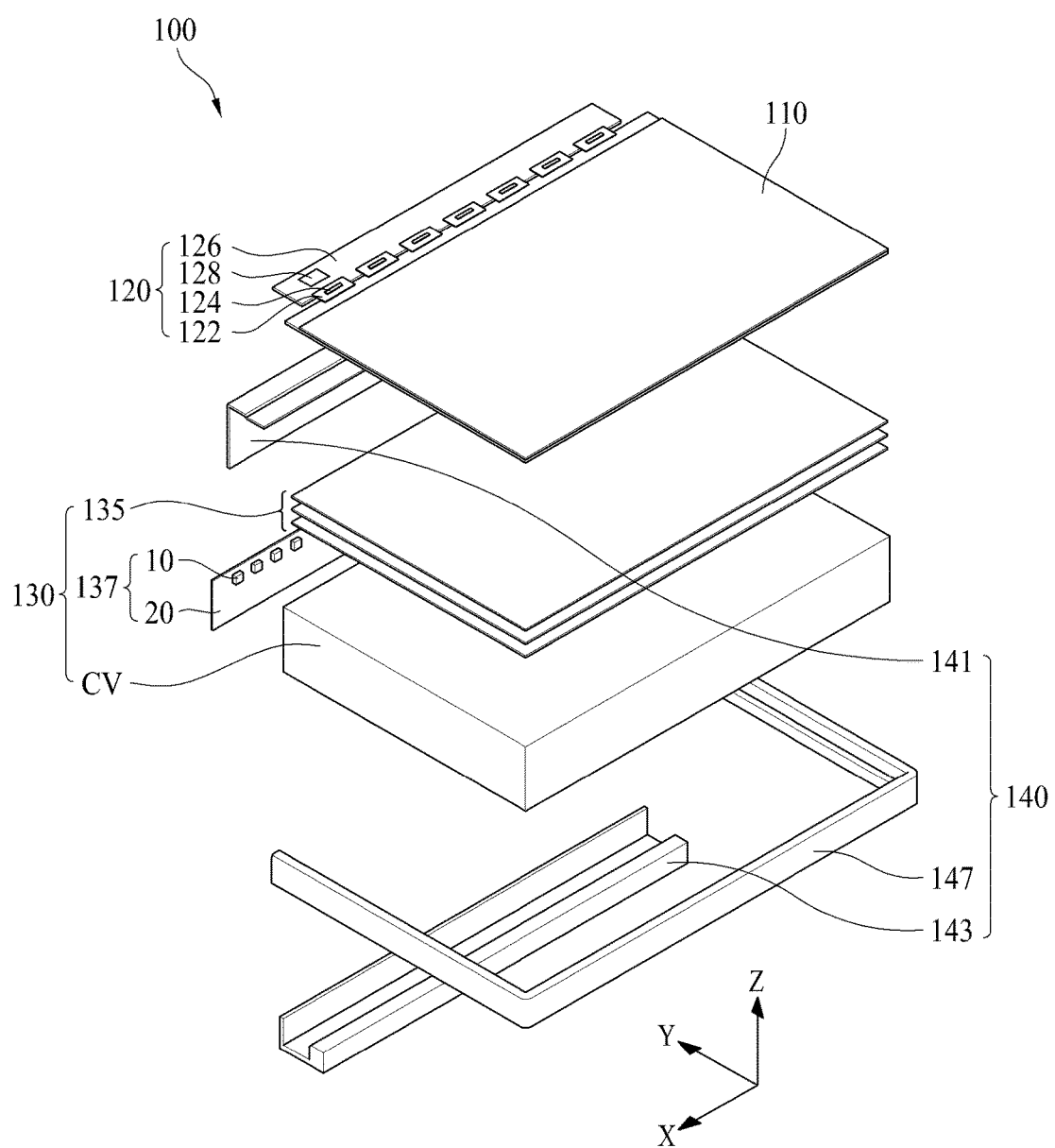
FIG. 2 is an exploded perspective view specifically illustrating a liquid crystal display device according to an aspect of the present disclosure.
Figure 3:
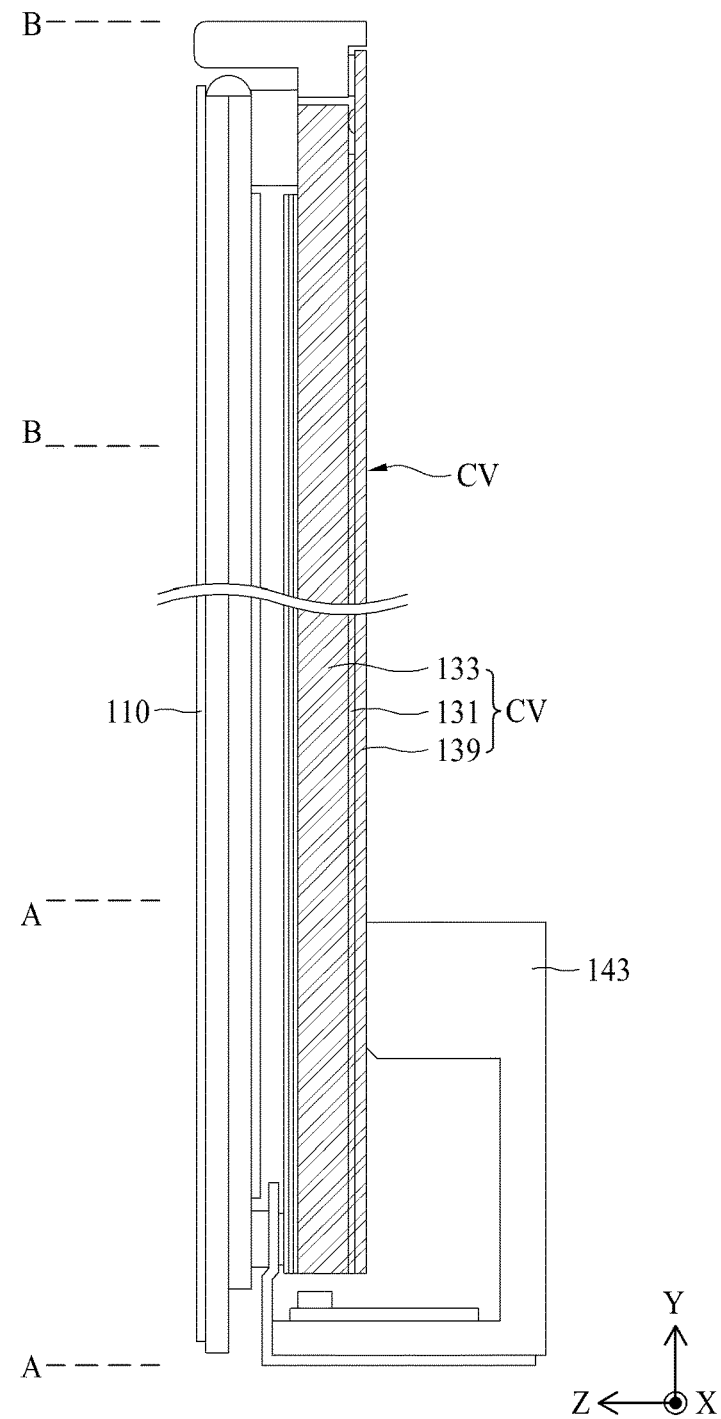
FIG. 3 is a cross-sectional view illustrating a liquid crystal display device according to an aspect of the present disclosure.

FIG. 1 is a perspective view illustrating a liquid crystal display device according to an aspect of the present disclosure. FIG. 2 is an exploded perspective view specifically illustrating a liquid crystal display device according to an aspect of the present disclosure. FIG. 3 is a cross-sectional view illustrating a liquid crystal display device according to an aspect of the present disclosure.

Collectively referring to FIGS. 1 to 3, a liquid crystal display device 100 according to an aspect of the present disclosure includes a liquid crystal panel 110, a panel driver 120, a back light unit 130, and a panel support 140.

The liquid crystal panel 110 displays an image by controlling light transmittance of a liquid crystal layer, and may include a lower substrate and an upper substrate bonded to each other by interposing the liquid crystal layer (not shown) therebetween, a lower polarizing member, and an upper polarizing member. The liquid crystal panel 110 displays a predetermined color image in accordance with light transmittance of the liquid crystal layer by driving the liquid crystal layer in accordance with the electric field formed per pixel by a data voltage and a common voltage applied per pixel.

The panel driver 120 is connected to a pad portion provided on the lower substrate and displays a predetermined color image on the liquid crystal panel 110 by driving each pixel of the liquid crystal panel 110. The panel driver 120 according to an aspect of the disclosure includes a plurality of circuit films 122 connected to the pad portion of the liquid crystal panel 110, a data driving integrated circuit 124 packaged in each of a plurality of circuit films 122, a display printed circuit board 126 coupled to each of the plurality of circuit films 122, and a timing controller 128 packaged in the display printed circuit board 126.

The back light unit 130 is arranged below the liquid crystal panel 110 and irradiates light to a lower surface of the liquid crystal panel 110. The back light unit 130 according to an aspect may include an optical sheet portion 135, a light source module 137, and a back cover CV integrated with a light guide plate.

The optical sheet portion 135 is arranged on the back cover CV integrated with a light guide plate, and may include a lower diffusion sheet, a prism sheet, and an upper diffusion sheet. However, the optical sheet portion 135 may include a deposited combined structure of two or more selected from a diffusion sheet, a prism sheet, a dual brightness enhancement film and a lenticular sheet without limitation to the above sheets.

The light source module 137 is arranged to face a first side of the back cover CV integrated with a light guide plate, and irradiates light to a light incident surface provided at the first side of the back cover CV. The light source module 137 according to an aspect of the present disclosure includes a plurality of light sources 10 packaged in a light source printed circuit board 20 (hereinafter, referred to as printed circuit board) to emit light through a light source driving signal supplied from a back light driver (not shown).

The back cover CV integrated with a light guide plate is arranged such that the first side faces the light source module 137. The upper surface of the back cover CV integrated with a light guide plate may face the lower surface of the optical sheet portion 135, and the lower surface of the back cover CV integrated with a light guide plate may be exposed to the outside. The back cover CV integrated with a light guide plate according to an aspect of the present disclosure may include a light guide plate 133 facing the lower surface of the optical sheet portion 135, a reflective sheet 131 arranged on the lower surface of the light guide plate 133, and a cover glass 139 arranged on the lower surface of the reflective sheet 131. The back cover CV integrated with a light guide plate according to an aspect of the present disclosure is configured such that the light guide plate 133 is bonded to the cover glass 139 by interposing the reflective sheet 131 therebetween. That is, in the back cover CV integrated with a light guide plate according to an aspect of the present disclosure, the reflective sheet 131, the light guide plate 133 and the cover glass 139 are integrated with one another. In the back cover CV integrated with a light guide plate according to an aspect of the present disclosure, even though humidity or heat is generated in the back light unit 130, since the light guide plate 133 and the cover glass 139 press the upper surface and the lower surface of the reflective sheet 131, the reflective sheet 131 of a thin thickness may be prevented from being wrinkled. Therefore, the back light unit 130 and the liquid crystal display device 100 according to an aspect of the present disclosure can prevent picture quality from being deteriorated by applying the back cover CV integrated with a light guide plate. Also, in the back cover CV integrated with a light guide plate according to an aspect of the present disclosure, as the reflective sheet 131 of a thin thickness, the light guide plate 133 and the cover glass 139 are integrated with one another, rigidity can be obtained. Accordingly, the light guide plate 133 and the cover glass 139 can be prevented from being damaged when they are moving during the manufacture of the product, and the process can be simplified.

The back cover CV integrated with a light guide plate will be described in detail with reference to FIGS. 4 to 8.

The panel support 140 supports the liquid crystal panel 110 and the back light unit 130. The panel support 140 according to an aspect of the present disclosure includes a first panel guide 141, a light source housing 143, and a second panel guide 147.

The light source housing 143 is arranged to be extended from the side of the back light unit 130 to the lower surface thereof, and surrounds the light source module 137 and supports the first panel guide 141.

The second panel guide 147 supports the other side of the liquid crystal panel 110 from the lower portion of the liquid crystal panel 110 arranged in a non-light incident portion except for the light incident portion.

The back light unit 130 and the liquid crystal display device 100 according to an aspect of the present disclosure can prevent picture quality from being deteriorated. This can be achieved by applying the back cover CV integrated with a light guide plate. Accordingly, the light guide plate 133 and the cover glass 139 can be prevented from being damaged when they are moving during the manufacture of the product, and the process may be simplified.

Figure 4:
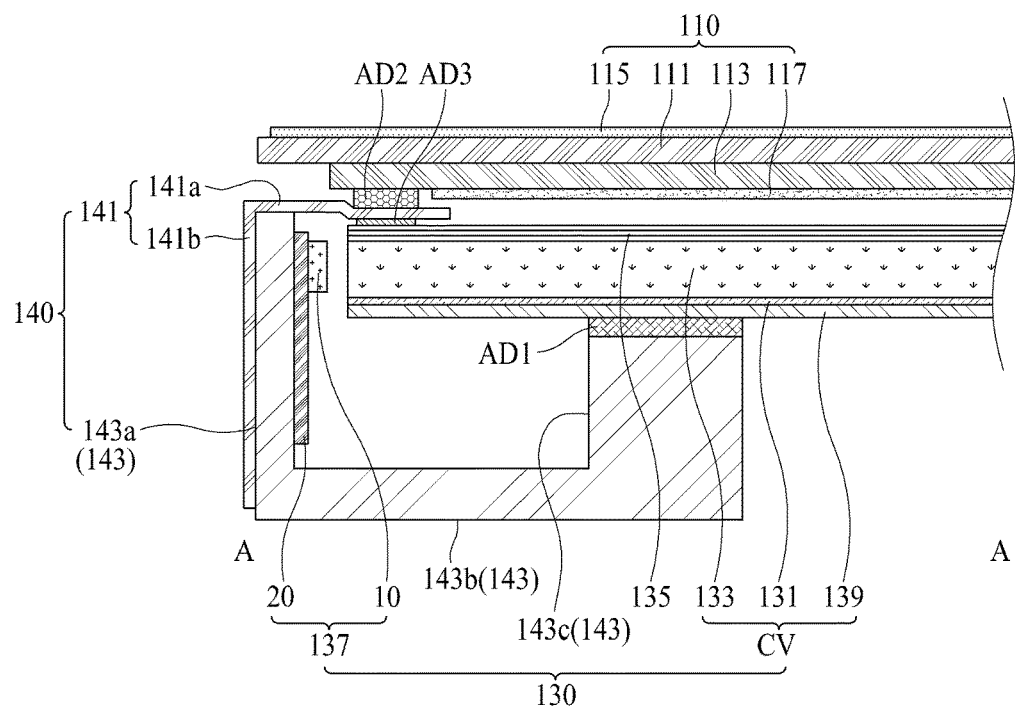
FIG. 4 is a cross-sectional view taken along line of A-A of FIG. 1, illustrating a liquid crystal display device according to an aspect of the present disclosure.

FIG. 4 is a cross-sectional view taken along line of A-A of FIG. 1, illustrating a liquid crystal display device according to an aspect of the present disclosure.

Referring to FIG. 4, the liquid crystal display device 100 according to an aspect of the present disclosure includes a liquid crystal panel 110, a back light unit 130, and a panel support 140.

The liquid crystal panel 110 is arranged on the back cover CV integrated with a light guide plate, and displays a predetermined image by using light irradiated from the back light unit 130. This liquid crystal panel 110 includes an upper substrate 111 and a lower substrate 113 bonded to each other by interposing a liquid crystal layer (not shown) therebetween, an upper polarizing member 115 attached to the upper substrate 111, and a lower polarizing member 117 attached to the lower substrate 113.

The upper substrate 111 is a thin film transistor array substrate, and includes a plurality of pixels (not shown) arranged per area where a plurality of gate lines (not shown) cross a plurality of data lines (not shown). Each pixel may include a thin film transistor (not shown) connected to the gate and data lines, a pixel electrode connected to the thin film transistor, and a common electrode arranged to adjoin the pixel electrode and supplied with a common voltage. At this time, the common electrode may be arranged on the lower substrate 113 in accordance with a driving mode of the liquid crystal layer. The upper substrate 111 displays a predetermined color image on the liquid crystal panel 110 by forming an electric field corresponding to a differential voltage between a data voltage and a common voltage, which are applied to each pixel, and controlling light transmittance of colored light transmitting the lower substrate 112 and the liquid crystal layer.

A pad portion to which various signals for driving each pixel are supplied is provided at a lower side of the upper substrate 111. At this time, the panel driver 120 for driving the liquid crystal panel 110 is connected to the panel driver.

The lower substrate 113 is a color filter array substrate, and may be formed to have, but not limited to, an area relatively smaller than that of the upper substrate 111. The lower substrate 113 is bonded to the upper substrate 111 by interposing the liquid crystal layer therebetween, whereby the lower substrate 113 is overlapped with the other area except the pad portion of the upper substrate 111. At this time, the lower substrate 113 may include a horizontal and vertical light-shielding layer (not shown) for defining a pixel area corresponding to each pixel formed on the upper substrate, an edge light-shielding layer (not shown) formed at an edge portion of the lower substrate 113, and a color filter (not shown) formed per pixel area. The color filter filters light incident through the lower substrate 113 from the back light unit 130 and entering the upper substrate 111 as predetermined color light. A common electrode (not shown) to which a common voltage is supplied may be arranged on the lower substrate 113 in accordance with a driving mode of the liquid crystal layer.

Meanwhile, the detailed elements of the upper substrate 111 and the lower substrate 113 may be formed in various shapes known in the art in accordance with the driving mode of the liquid crystal layer, for example, a TN (Twisted Nematic) mode, a VA (Vertical Alignment) mode, an IPS (In plane switching) mode, and an FFS (Fringe field switching) mode.

The upper polarizing member 115 is attached to the upper surface of the upper substrate 111, and polarizes color light emitted to the outside by transmitting the upper substrate 111.

The lower polarizing member 117 is attached to the lower surface of the lower substrate 113, and is arranged except an end of the lower substrate 113. The lower polarizing member 117 polarizes light incident from the back light unit 130.

The back light unit 130 is arranged on a rear surface of the liquid crystal panel 110, and irradiates light to the entire rear surface of the liquid crystal panel 110. The back light unit 130 according to one aspect includes an optical sheet portion 135, a light source module 137, and a back cover CV integrated with a light guide plate.

The optical sheet portion 135 is arranged on the back cover CV integrated with a light guide plate, and improves luminance characteristic of light forwarding toward the liquid crystal panel 110 from the light guide plate 133 of the back cover CV integrated with a light guide plate, which will be described later.

One side of the light source module 137 is arranged to adjoin the light source housing 143 and the other side thereof is arranged to face the first side of the back cover CV integrated with a light guide plate. As such, the light source module 137 irradiates light to a light incident surface provided in the light guide plate 133 of the back cover CV integrated with a light guide plate, which will be described later. The light source module 137 according to an aspect of the present disclosure includes a light source 10 and a printed circuit board 20.

The light source 10 faces the light incident surface provided in the light guide plate 133 of the back cover CV integrated with a light guide, and is packaged in the printed circuit board 20. The light source 10 is electrically connected to a driving power line formed in the printed circuit board 20, and emits light through a driving power supplied from the driving power line.

The printed circuit board 20 includes a driving power line to which a driving power is externally supplied. The printed circuit board 20 emits light by supplying the driving power, which is supplied from the outside through the driving power line, to the light source 10 to emit light from the light source 10.

The back cover CV integrated with a light guide plate is arranged such that the first side faces the light source module 137. The upper surface of the back cover CV integrated with a light guide plate faces the lower surface of the optical sheet portion 135, and the lower surface of the back cover CV integrated with a light guide plate may be exposed to the outside. The back cover CV integrated with a light guide plate according to an aspect of the present disclosure may include a light guide plate 133 of which upper surface faces the lower surface of the optical sheet portion 135, a reflective sheet 131 arranged on the lower surface of the light guide plate 133, and a cover glass 139 arranged on the lower surface of the reflective sheet 131.

The light guide plate 133 is formed in a flat (or wedge) type to have a light incident surface provided on at least one side, and forwards light incident through the light incident surface from the light source module 137 to the liquid crystal panel 110. The light guide plate 133 according to an aspect of the present disclosure may be made of a glass material.

The reflective sheet 131 is arranged on the lower surface of the light guide plate 133 and reflects light incident from the light guide plate 133 toward the light guide plate 133. Thus, loss of light entering the rear surface of the light guide plate 133 can be minimized and light incident from the light guide plate 133 is reflected toward the liquid crystal panel 110.

The cover glass 139 is arranged on the lower surface of the reflective sheet 131, and protects the entire rear surface of the back light unit 130. The light source housing 143, which will be described later, is arranged on the lower surface of the cover glass 139. At this time, the lower surface of the cover glass 139, on which the light source housing 143 is not arranged, is exposed to the outside. The cover glass 130 according to an aspect of the present disclosure may be made of a glass material together with the light guide plate 133. Therefore, as the light guide plate 133 and the cover glass 139 are bonded to each other, the back cover CV integrated with a light guide plate according to an aspect of the present disclosure may have an improved adhesive force, whereby reliability of the back cover CV integrated with a light guide plate can be increased. In addition, since the cover glass 130 according to an aspect of the present disclosure is made of the same glass material as that of the light guide plate 133, thermal expansion and thermal deformation can be avoided. Even though the cover glass 130 is expanded by heat, since the cover glass 139 and the light guide plate 133 are made of the same material, there is no difference in a thermal expansion level, whereby deformation can be avoided. Also, in case of the back cover CV integrated with a light guide plate, to which the cover glass 130 according to an aspect of the present disclosure is applied, since the cover glass 139 exposed to the outside is made of a glass material, deformation caused by an external force can be avoided due to elasticity of glass.

The panel support 140 includes a first panel guide 141 and a light source housing 143.

The first panel guide 141 is coupled to the liquid crystal panel 110 through a first panel coupling member AD2 and supports the liquid crystal panel 110. The first panel coupling member AD2 may be coupled to the lower substrate 113 of the liquid crystal panel 110 considering a coupling force, thickness, etc. of the first panel guide 141 and the liquid crystal panel 110. However, the first panel coupling member AD2 may be coupled to the lower polarizing member 117 of the liquid crystal panel 110 without limitation to the lower substrate 113. For example, the first panel coupling member AD2 may be a double sided tape, a thermal hardening adhesive, a photo-hardening adhesive, or a foam tape. The first panel coupling member AD2 may be a double sided tape or foam tape, which has a certain elastic force to absorb impact. Additionally, the first panel coupling member AD2 may include a hollow portion. In this case, the hollow portion prevents delamination of the first panel coupling member AD2 and the liquid crystal panel 110 during movement of the liquid crystal panel 110 while buffering a pressure applied to the liquid crystal panel 110.

Also, the first panel guide 141 may be coupled to the optical sheet portion 135 through the first guide coupling member AD3.

The first panel guide 141 according to an aspect includes a panel support surface 141a and a guide coupling surface 141b.

The panel support surface 141a is coupled to a rear edge portion of the liquid crystal panel 110 through the first panel coupling member AD2. Although the panel support surface 141a is coupled to a rear edge portion of the lower substrate 113 by the first panel coupling member AD2, the panel support surface 141a may be coupled to an edge portion of the lower polarizing film 117 attached to the entire rear surface of the lower substrate 113.

The guide coupling surface 141b is vertically bent toward the light source module 137 from the panel support surface 141 and then coupled to the light source housing 143. The guide coupling surface 141b is coupled to the light source housing 143 by a coupling member such as a tape.

The light source housing 143 is arranged at a side and a rear surface of the back light unit 130 to surround the light source module 137, and supports the first panel guide 141. The light source housing 143 according to one aspect includes a housing coupling surface 143a, a housing protrusion surface 143b, and a housing bending surface 143c.

One side of the housing coupling surface 143a adjoins the printed circuit board 20 and the other side thereof adjoins the guide coupling surface 141b of the panel guide 141. The housing coupling surface 143a may be coupled to the guide coupling surface 141b and the printed circuit board 20 by a coupling member such as a tape.

The housing protrusion surface 143b is vertically bent toward the rear surface of the back light unit 130 from one end of the housing coupling surface 143a, and surrounds the light source module 137.

The housing bending surface 143c is vertically bent from one end of the housing protrusion surface 143b to adjoin the back cover CV integrated with a light guide plate, and supports the back cover CV integrated with a light guide plate. One end of the housing bending surface 143c may be coupled to the back cover CV integrated with a light guide plate by a housing coupling member AD1. The housing coupling member AD1 may be a double sided tape, a thermal hardening adhesive, a photo-hardening adhesive, or a foam tape.

As the back cover CV integrated with a light guide plate, in which the light guide plate 133 and the cover glass 139, which are made of a glass material, are bonded to each other, is applied to the back light unit 130. Accordingly, the liquid crystal display device 100 according to an aspect of the present disclosure, deformation can be avoided and reliability can be increased.

Figure 5:
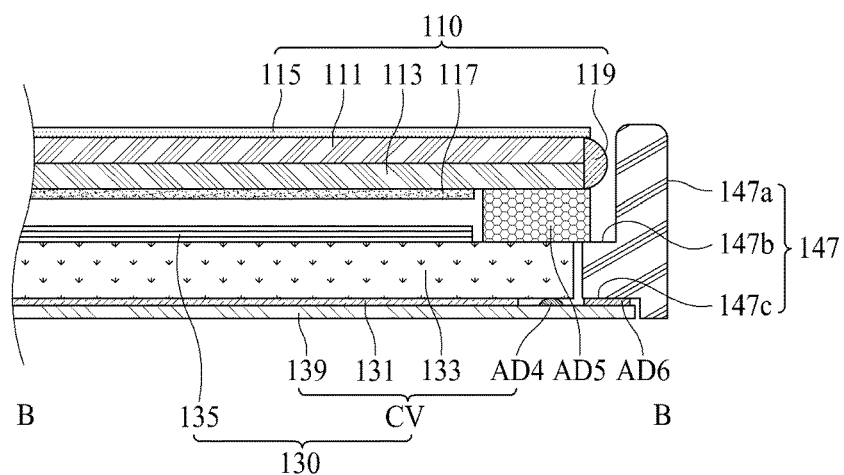
FIG. 5 is a cross-sectional view taken along line of B-B of FIG. 1, illustrating a liquid crystal display device according to an aspect of the present disclosure.

FIG. 5 is a cross-sectional view taken along line of B-B of FIG. 1 according to an aspect of the present disclosure and is extended portion from the cross-sectional view of the liquid crystal display device 100 shown in FIG. 4. Therefore, in the following description, a side sealing member 119, a light guide coupling member AD4 of the back cover CV integrated with a light guide plate, a second panel coupling member AD5, a second panel guide 147, and a second guide coupling member AD6 will only be described, and repeated description of the same elements as those of FIG. 4 will be omitted.

The side sealing member 119 is arranged to cover sides of the upper substrate 111 and the lower substrate 117 to avoid light leakage of the upper substrate 111 and the lower substrate 117 and protect the sides of the upper substrate 111 and the lower substrate 117. The side sealing member 119 may be made of a thermal hardening resin or a photo-hardening resin.

The light guide plate coupling member AD4 is included in the back cover CV integrated with a light guide plate according to an aspect of the present disclosure. The light guide plate coupling member AD4 is arranged between the light guide plate 133 and the cover glass 139, and couples the light guide plate 133 with the cover glass 139. The light guide plate coupling member AD4 may be a resin, a double sided tape, a thermal hardening adhesive, a photo-hardening adhesive, or a foam tape.

One side of the second panel coupling member AD5 adjoins the liquid crystal panel 110 and the other side thereof adjoins the light guide plate 133, and is coupled to the liquid crystal panel 1110 to support the liquid crystal panel 110. The second panel coupling member AD5 according to an aspect may be a double sided tape, a thermal hardening adhesive, a photo-hardening adhesive, or a foam tape. Alternatively, the second panel coupling member AD5 may be a double sided tape or foam tape, which has a certain elastic force to absorb impact. When the second panel coupling member AD5 adjoins a material such as glass rather than a material such as plastic, its adhesive force is improved. Since the liquid crystal panel 110 and the light guide plate 133 according to an aspect of the present disclosure are made of a glass material, delamination of the second panel coupling member AD5 can be avoided, whereby reliability of the liquid crystal display device 100 can be increased. Additionally, the second panel coupling member AD5 may include a hollow portion. In this case, the hollow portion prevents delamination of the second panel coupling member AD5 and the liquid crystal panel 110 during movement of the liquid crystal panel 110 while buffering a pressure applied to the liquid crystal panel 110. Also, in the liquid crystal display device 100 according to an aspect of the present disclosure, the liquid crystal panel 110 and the light guide plate 133, which are made of glass material to have a flat thickness, are directly coupled to each other by the second panel coupling member AD5. The thickness liquid crystal panel can be formed unevenly, so that light leakage can be avoided.

The second panel guide 147 prevents the liquid crystal panel 110 and the back light unit 130 from being exposed to the outside. The second panel guide 147 according to an aspect includes a guide sidewall 147a, a panel support surface 147b, and a guide fixing surface 147c.

The guide sidewall 147a covers the non-light incident portion of the liquid crystal panel 110 and the back light unit 130 so as not to be exposed to the outside.

The panel support surface 147b may be coupled to, but not limited to, the rear edge portion of the liquid crystal panel 110 through the second panel coupling member AD5.

The guide fixing surface 147c corresponds to a rear surface of the panel support surface 147b, and is coupled to the edge portion of the cover glass 139 extended to the guide fixing surface 147c by the second coupling member AD6.

The second guide coupling member AD6 may be a double sided tape, a thermal hardening adhesive, a photo-hardening adhesive, or a foam tape.

As described above, in the back light unit 130 and the liquid crystal display device 100 according to an aspect of the present disclosure, the liquid crystal panel 110 and the light guide plate 133, which are made of glass material, are coupled to one side and the other side of the panel coupling member AD5. Accordingly, reliability can be increased and light leakage can be avoided.

Figure 6:
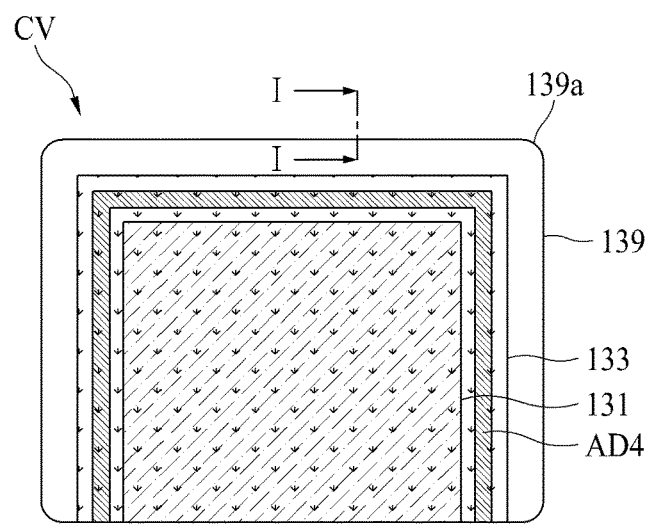
FIG. 6 is a plane view illustrating a back cover integrated with a light guide plate according to an aspect of the present disclosure.

FIG. 6 is a plane view illustrating a back cover integrated with a light guide plate according to an aspect of the present disclosure.

Referring to FIG. 6, the back cover CV integrated with a light guide plate according to an aspect of the present disclosure includes a reflective sheet 131, a light guide plate 133, a light guide plate coupling member AD4, and a cover glass 139.

The reflective sheet 131 is arranged on the cover glass 139. A first side of the reflective sheet 131 may be matched with a first side of the cover glass 139 facing the light source module 137 at an end. The reflective sheet 131 overlaps the cover glass 139 at the edge of the first side. The other sides except for the first side of the reflective sheet 131 are arranged except for the edge of the cover glass 139. That is, the reflective sheet 131 may be arranged to have a size smaller than that of the cover glass 139.

The light guide plate 133 is arranged on the cover glass 139 by interposing the reflective sheet 131 therebetween, and is arranged to cover the reflective sheet 131. The first side of the light guide plate 133 having a light incident surface may be matched with the first side of the cover glass 139 facing the light source module 137 at the end. The light guide plate 133 is smaller than the cover glass 139 except the first side. The light guide plate 133 and the cover glass 139 may overlap each other at the first side of the back cover CV integrated with a light guide plate having a light incident surface. The other sides except for the first side of the light guide plate 133 are arranged except the edge of the cover glass 139. That is, the light guide plate 133 may be arranged to have a size smaller than that of the cover glass 139. At this time, the light guide plate 133 is arranged to cover the reflective sheet 131. That is, the light guide plate 133 is arranged to have a size greater than that of the reflective sheet 131. The first side of the light guide plate 133 may be matched with the first side of the reflective sheet 131 at the end. The other sides except for the first side of the light guide plate 133 may be arranged to have a size greater than that of the reflective sheet 131. Therefore, the reflective sheet 131 is not arranged at the edge except for the first side.

The light guide plate coupling member AD4 is arranged between the light guide plate 133 and the cover glass 139, and couples the light guide plate 131 of the back cover CV integrated with a light guide plate and the cover glass 139 with each other. The light guide plate coupling member AD4 is arranged at the edge of the light guide plate 133. The light guide plate coupling member AD4 according to an aspect may be arranged to surround the edge of the light guide plate 133 which does not overlap the reflective sheet 131. The back cover CV integrated with a light guide plate has a light incident surface at the first side, and the light guide plate coupling member AD4 according to an aspect may be arranged to surround the edge of the light guide plate 133 except for the first side. Therefore, in the back light unit 140 and the liquid crystal display device 100 according to an aspect of the present disclosure, light emitted from the light source module 137 may enter the light incident surface of the light guide plate 133. The light guide plate coupling member AD4 according to an aspect may be a resin, a double sided tape, a thermal hardening adhesive, a photo-hardening adhesive, or a foam tape.

The cover glass 139 may overlap the reflective sheet 131 and the light guide plate 133 except for the edge. At this time, the first side of the cover glass 139, which faces the light source module 137, may overlap the reflective sheet 131 and the light guide plate 133 at the edge. The edge except for the first side of the cover glass 139 may be coupled to the guide fixing surface 147c of the second guide panel 147 by the second guide coupling member AD6. The cover glass 139 according to an aspect of the present disclosure may have a rounded type apex 139a. A curvature is generated in the apex 139a of the cover glass 139 according to an aspect of the present disclosure to avoid stress concentration, whereby the cover glass 139 may be prevented from being damaged, and a worker may perform the process more stably.

In the back cover CV integrated with a light guide plate according to an aspect of the present disclosure, even though humidity or heat is generated in the back light unit 130, since the light guide plate 133 and the cover glass 139 press the upper surface and the lower surface of the reflective sheet 131, the reflective sheet 131 of a thin thickness may be prevented from being wrinkled. Therefore, the back light unit 130 and the liquid crystal display device 100 according to an aspect of the present disclosure may prevent picture quality from being deteriorated by applying the back cover CV integrated with a light guide plate. In addition, in the back cover CV integrated with a light guide plate according to an aspect of the present disclosure, as the reflective sheet 131 of a thin thickness, the light guide plate 133 and the cover glass 139 are integrated with one another, rigidity can be obtained. Therefore, the light guide plate 133 and the cover glass 139 can be prevented from being damaged when they are moving during the manufacture of the product, and the process may be simplified.

Figure 7:
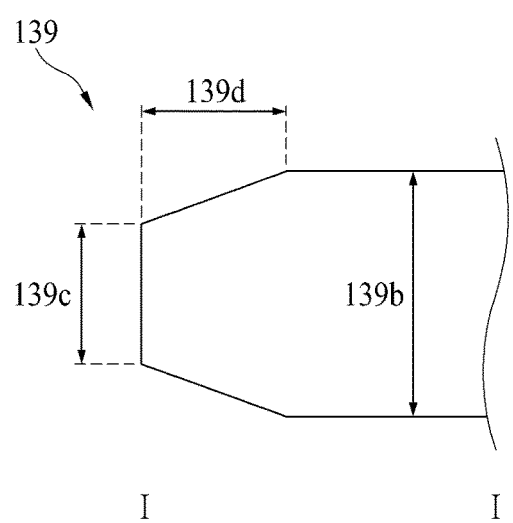
FIG. 7 is a cross-sectional view taken along line of I-I of FIG. 6, illustrating a cover glass according to one aspect of the present disclosure.

FIG. 7 is a cross-sectional view taken along line of I-I of FIG. 6, illustrating a cover glass according to an aspect of the present disclosure.

Referring to FIG. 7, the cover glass 139 according to an aspect of the present disclosure has a chamfer type corner portion. In more detail, the cover glass 139 according to an aspect of the present disclosure has a certain glass thickness 139b except for an end and its thickness is gradually reduced by a thickness reduction unit 139d. Thus, a thickness 139c of the end is thinner than the glass thickness 139b. In this way, the cover glass 139 according to an aspect of the present disclosure can prevent stress concentration due to rapid type change of the section at the corner portion from occurring, whereby the cover glass 139 of glass material can be prevented from being damaged and reliability of the cover glass 130 can be improved.

FIG. 8 is a flow chart illustrating a method of manufacturing a back cover integrated with a light guide plate according to an aspect of the present disclosure.

First of all, glass is processed to form the cover glass 139. At this time, the cover glass 139 is processed in such a manner that its apex is processed in a round shape and its corner portion is processed in a chamfer shape (S10).

Secondly, the processed cover glass 139 is pre-heated. For example, a pre-heat temperature may be approximately 400° C. Then, the pre-heated cover glass 139 is subjected to chemical strengthening. In more detail, sodium ions of the surface of the cover glass 139 is partially replaced with potassium ions of which radius is greater than that of the sodium ion. Thus, a compression stress layer can be formed on the surface to strengthen the glass surface. For example, the chemical strengthening temperature may be approximately 800° C. In this way, if the cover glass 139 is subjected to chemical strengthening, even though impact is applied to the cover glass 139, the damage of the cover glass 139 is not transferred to a portion other than the portion where impact is applied to the cover glass 139, whereby the cover glass 139 can be maintained safely (S20).

Thirdly, an external pattern is printed on the cover glass 139. At this time, the position where the external pattern is printed corresponds to a portion where the cover glass 139 is not exposed to the outside. For example, a process of printing the external pattern on the cover glass 139 may be a process of washing the cover glass 139, squeeze printing, drying, hardening, and then washing the cover glass 139. Frequency of the external pattern printing may be added whenever additional pattern printing, high gloss printing, etc. are added on the cover glass 139. After the external pattern is printed, a light-shielding pattern is printed on a printing surface of the cover glass 139. The light-shielding pattern may only be printed on the cover glass 139 according to an aspect without external pattern. The cover glass 139 according to an aspect of the present disclosure is made of glass material, whereby the external pattern and the light-shielding pattern may be printed inside the back cover CV integrated with a light guide plate, instead of the surface where the cover glass 139 is exposed to the outside. Therefore, the cover glass 139 according to an aspect of the present disclosure may be printed so as not to peel the external pattern and the light-shielding pattern, whereby external appearance can be designed easily (S30).

Fourthly, the reflective sheet 131 is bonded onto the cover glass 139. For example, the process of bonding the reflective sheet 131 onto the cover glass 130 may be a process of attaching two sheets of papers or paperboards or more to each other through an adhesive or attaching a metal foil or plastic film to paper or paperboard through an adhesive or a heat sealing method (S40).

Fifthly, the light guide plate coupling member AD4 is deposited on the cover glass 139 onto which the reflective sheet 131 is bonded, whereby the light guide plate 133 is bonded to the cover glass 139 (S50).

As described above, the back cover CV integrated with a light guide plate according to an aspect of the present disclosure can prevent the damage of the cover glass 139 from being spread by chemically strengthening the cover glass 139. In addition, design external appearance can be readily achieved by performing printing so as not to peel external and light-shielding patterns inside the cover glass 139.

According to the present disclosure, the following advantages can be obtained.

In the back cover integrated with a light guide plate according to an aspect, even though humidity or heat is generated in the back light unit, since the light guide plate and the cover glass press the upper surface and the lower surface of the reflective sheet, the reflective sheet of a thin thickness can be prevented from being wrinkled.

The back light unit and the liquid crystal display device according to an aspect of the present disclosure can prevent picture quality from being deteriorated by applying the back cover integrated with a light guide plate.

In the back cover integrated with a light guide plate according to an aspect of the present disclosure, as the reflective sheet of a thin thickness, the light guide plate and the cover glass are integrated with one another, rigidity can be obtained. Accordingly, the light guide plate and the cover glass can be prevented from being damaged when they are moving during the manufacture of the product, and the process may be simplified.

As the light guide plate and the cover glass, which are made of the same material, are bonded to each other, the back cover integrated with a light guide plate according to an aspect of the present disclosure can have an improved adhesive force, whereby reliability of the back cover integrated with a light guide plate can be increased.

Since the cover glass according to an aspect of the present disclosure is made of glass material, thermal expansion and thermal deformation can be avoided.

In case of the back cover integrated with a light guide plate, to which the cover glass according to an aspect of the present disclosure is applied, since the cover glass exposed to the outside is made of glass material, deformation caused by an external force can be avoided due to elasticity of glass.

The curvature is generated in the apex of the cover glass according to an aspect of the present disclosure to avoid stress concentration, whereby the cover glass may be prevented from being damaged, and a worker may perform the process more stably.

The cover glass according to an aspect of the present disclosure can be printed so as not to peel the external pattern and the light-shielding pattern, whereby external appearance can be designed easily.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A back cover for a display device integrated with a light guide plate, comprising:
   a cover glass having a chamfer type corner portion;
   a reflective sheet attached onto the cover glass;
   the light guide plate attached onto the cover glass covering the reflective sheet; and
   a light guide plate coupling member between the light guide plate and the cover glass,
   wherein the light guide plate coupling member is arranged at an edge of the light guide plate.

2. The back cover of claim 1, wherein the back cover has a light incident surface at a first side, and the light guide plate coupling member surrounds the edge of the light guide plate except for the first side.

3. The back cover of claim 2, wherein the light guide plate has a length smaller than that of the cover glass at a second side, and the reflective sheet and the cover glass vertically overlap each other at the edge of the first side.

4. The back cover of claim 3, wherein the light guide plate is made of a glass material together with the cover glass.

5. A back cover for a display device integrated with a light guide plate, comprising:
   a cover glass having a rounded shape apex;
   a reflective sheet attached onto the cover glass;
   the light guide plate attached onto the cover glass covering the reflective sheet; and
   a light guide plate coupling member between the light guide plate and the cover glass,
   wherein the light guide plate coupling member is arranged at an edge of the light guide plate.

6. A liquid crystal display device comprising:
   a cover glass having a chamfer type corner portion;
   a reflective sheet attached onto the cover glass;
   a light guide plate attached onto the cover glass covering the reflective sheet; and
   a light guide plate coupling member between the light guide plate and the cover glass, wherein the light guide plate coupling member is arranged at an edge of the light guide plate;
   a liquid crystal panel on the light guide plate;
   a panel guide supporting the liquid crystal panel;
   a light source housing supporting the panel guide; and
   a light source module adjoining the light source housing, arranged to face the light incident surface.

7. The liquid crystal display device of claim 6, further comprising a panel coupling member between the liquid crystal panel and the light guide plate.

8. A method of manufacturing a back cover integrated with a light guide plate, the method comprising:
   processing a corner of a cover glass to form a chamber type corner portion;
   strengthening the cover glass;
   printing a pattern on a surface where the cover glass is not exposed to the outside;
   bonding a reflective sheet to the cover glass; and
   bonding the light guide plate to the cover glass covering the reflective sheet.

9. The method of claim 8, wherein the bonding the light guide plate includes spreading a light guide plate coupling member to an edge of the light guide plate to attach to the cover glass.

10. A back cover of a display device, comprising:
    a cover glass having an elasticity;
    a light guide plate integrated with the cover glass and having the same material as the cover glass;
    a reflective sheet between the cover glass and the light guide plate; and
    a light guide plate coupling member attaching the light guide plate to the cover glass, wherein the light guide plate integrated with the cover glass are disposed to press both upper and lower sides of the reflective sheet to prevent damages on the reflective sheet, and
    wherein the cover glass has a chamfer type corner portion.

11. The back cover of claim 10, wherein the back cover faces has a first side of a light incident surface facing a light source of the display device.

12. The back cover of claim 11, wherein the light guide plate coupling member surrounds the light guide plate except for the first side.

13. The back cover of claim 10, wherein the light guide plate has a length smaller than that of the cover glass.

14. The back cover of claim 10, wherein the reflective sheet and the cover glass vertically overlap each other at the first side.

15. The back cover of claim 10, wherein the cover glass is chemically strengthened.

16. The back cover of claim 15, wherein the chemical strengthening is performed by replacing sodium ions on surface of the cover glass with ions having a greater ion radius than that of the sodium ions at an elevated temperature.

17. A back cover of a display device, comprising:
    a cover glass having an elasticity;
    a light guide plate integrated with the cover glass and having the same material as the cover glass;
    a reflective sheet between the cover glass and the light guide plate; and
    a light guide plate coupling member attaching the light guide plate to the cover glass, wherein the light guide plate integrated with the cover glass are disposed to press both upper and lower sides of the reflective sheet to prevent damages on the reflective sheet, and
    wherein the cover glass has a rounded shape apex.

18. A back cover of a display device, comprising:
    a cover glass having an elasticity;
    a light guide plate integrated with the cover glass and having the same material as the cover glass;

a reflective sheet between the cover glass and the light guide plate; and a light guide plate coupling member attaching the light guide plate to the cover glass, wherein the light guide plate integrated with the cover glass are disposed to press both upper and lower sides of the reflective sheet to prevent damages on the reflective sheet, and wherein the cover glass has a printed pattern on a surface where the cover glass is not exposed to the outside.

* * * * *